United States Patent
Kang et al.

(10) Patent No.: US 8,285,243 B2
(45) Date of Patent: Oct. 9, 2012

(54) WAKE-UP RECEIVER AND WAKE-UP METHOD USING DUTY CYCLING AND POWER OFF TECHNIQUE

(75) Inventors: Ho-Yong Kang, Daejeon (KR); Dae-Young Yoon, Daejeon (KR); Trung-Kien Nguyen, Daejeon (KR); Ji-Eun Kim, Choongcheongbuk-do (KR); Xiaohua Yu, Daejeon (KR); Nae-Soo Kim, Daejeon (KR); Cheol-Sig Pyo, Daejeon (KR); Seok-Kyun Han, Daejeon (KR); Sang-Gug Lee, Daejeon (KR)

(73) Assignees: Electronics and Telecommunications Research Institute, Daejeon (KR); Korea Advanced Institute of Science and Technology, Daejeon (KR)

( * ) Notice: Subject to any disclaimer, the term of this patent is extended or adjusted under 35 U.S.C. 154(b) by 211 days.

(21) Appl. No.: 12/808,766

(22) PCT Filed: Dec. 3, 2008

(86) PCT No.: PCT/KR2008/007125
§ 371 (c)(1),
(2), (4) Date: Sep. 14, 2010

(87) PCT Pub. No.: WO2009/078600
PCT Pub. Date: Jun. 25, 2009

(65) Prior Publication Data
US 2011/0006824 A1    Jan. 13, 2011

(30) Foreign Application Priority Data
Dec. 18, 2007  (KR) .................. 10-2007-0133740

(51) Int. Cl.
*H04B 1/16* (2006.01)

(52) U.S. Cl. ..................................... 455/343.1; 455/574
(58) Field of Classification Search .... 455/343.1–343.6, 455/574; 327/175
See application file for complete search history.

(56) References Cited

U.S. PATENT DOCUMENTS
7,096,137 B2 * 8/2006 Shipton et al. ............... 327/175
7,298,172 B2 11/2007 Shibata et al.
(Continued)

FOREIGN PATENT DOCUMENTS
JP  2009-88394  4/2009
KR  10-2004-0024648  3/2004

OTHER PUBLICATIONS
Stefan von der Mark et al., "Three Stage Wakeup Scheme for Sensor Networks," International Conference on Microwave and Optoelectronics, 2005 SBMO/IEEE MTT-S; 2005, pp. 205-208.
(Continued)

*Primary Examiner* — Lana N Le
(74) *Attorney, Agent, or Firm* — Staas & Halsey LLP (57) ABSTRACT

Provided is a low-power wake-up receiver that is sensitive to electric waves, by which power consumed by a radio frequency (RF) transceiver of a sensor node in a ubiquitous sensor network (USN) is minimized. A wake-up receiver waking up a main transceiver includes a duty cycle signal generation unit controlling a duty cycle of a duty cycle signal; a burst signal detection unit receiving an input signal including a burst signal and a data signal based on the duty cycle signal, amplifying the input signal, and, if the amplified input signal is the burst signal, outputting a control signal; and a data signal detection unit re-amplifying the amplified input signal based on the control signal, and, if the re-amplified input signal is the data signal, outputting a wake-up signal. Power supplied to the duty cycle signal generation unit is interrupted based on the control signal and power is re-supplied to the duty cycle signal generation unit based on the wake-up signal.

14 Claims, 7 Drawing Sheets

U.S. PATENT DOCUMENTS

| | | |
|---|---|---|
| 2003/0119568 A1 | 6/2003 | Menard |
| 2004/0266386 A1* | 12/2004 | Kuo .......................... 455/343.2 |
| 2006/0116103 A1 | 6/2006 | Park et al. |
| 2006/0229053 A1 | 10/2006 | Sivard |
| 2006/0240798 A1* | 10/2006 | Jarosinski et al. ............ 455/574 |
| 2007/0178875 A1* | 8/2007 | Rao et al. ................... 455/343.1 |
| 2007/0197186 A1* | 8/2007 | Muqattash et al. ........... 455/574 |
| 2007/0213028 A1* | 9/2007 | Shohara et al. ............ 455/343.1 |
| 2009/0175381 A1* | 7/2009 | Bougard ....................... 327/175 |

OTHER PUBLICATIONS

N. Pletcher et al., "A 65 µW, 1.9 GHz RF to Digital Baseband Wakeup Receiver for Wireless Sensor Nodes," Proceedings of the IEEE 2007 Cusotm Integrated Circuits Conference (CICC 2007), Sep. 2007, pp. 539-542.

International Search Report for PCT/KR2008/007125, mailed on Feb. 11, 2009.

* cited by examiner

WAKE-UP RECEIVER AND WAKE-UP METHOD USING DUTY CYCLING AND POWER OFF TECHNIQUE

CROSS-REFERENCE TO RELATED PATENT APPLICATIONS

This application claims the benefit under 35 U.S.C. Section 371, of PCT International Application No. PCT/KR2008/007125, filed Dec. 3, 2008, which claimed priority to Korean Patent Application No. 10-2007-0133740, filed on Dec. 18, 2007, in the Korean Intellectual Property Office, the disclosure of which is incorporated herein in its entirety by reference.

BACKGROUND OF THE INVENTION

1. Field of the Invention

The present invention generally relates to a wireless reception wake-up system, and more particularly, to a wake-up receiver and wake-up method for minimizing power consumed by a radio frequency (RF) transceiver of a sensor node in a ubiquitous sensor network (USN).

The present invention is derived from a research project partly supported by the Information Technology (IT) Research & Development (R&D) program of the Ministry of Information and Communication (MIC) and the Institute for Information Technology Advancement (IITA) of Korea [2005-S-106-03, Development of Sensor Tag and Sensor Node Technologies for RFID/USN].

2. Description of the Related Art

As wireless communication become more widely used, networks integrating wired and wireless technologies have been deployed in various fields. Accordingly, requirements for a technical standard for high-speed, low-cost, and low-power wireless communications have been proposed.

To this end, various wake-up receivers have been introduced, which reduce power consumption and extend battery life by switching off a main transceiver in most cases and switching on the main transceiver only when it performs communications.

Figure 1:
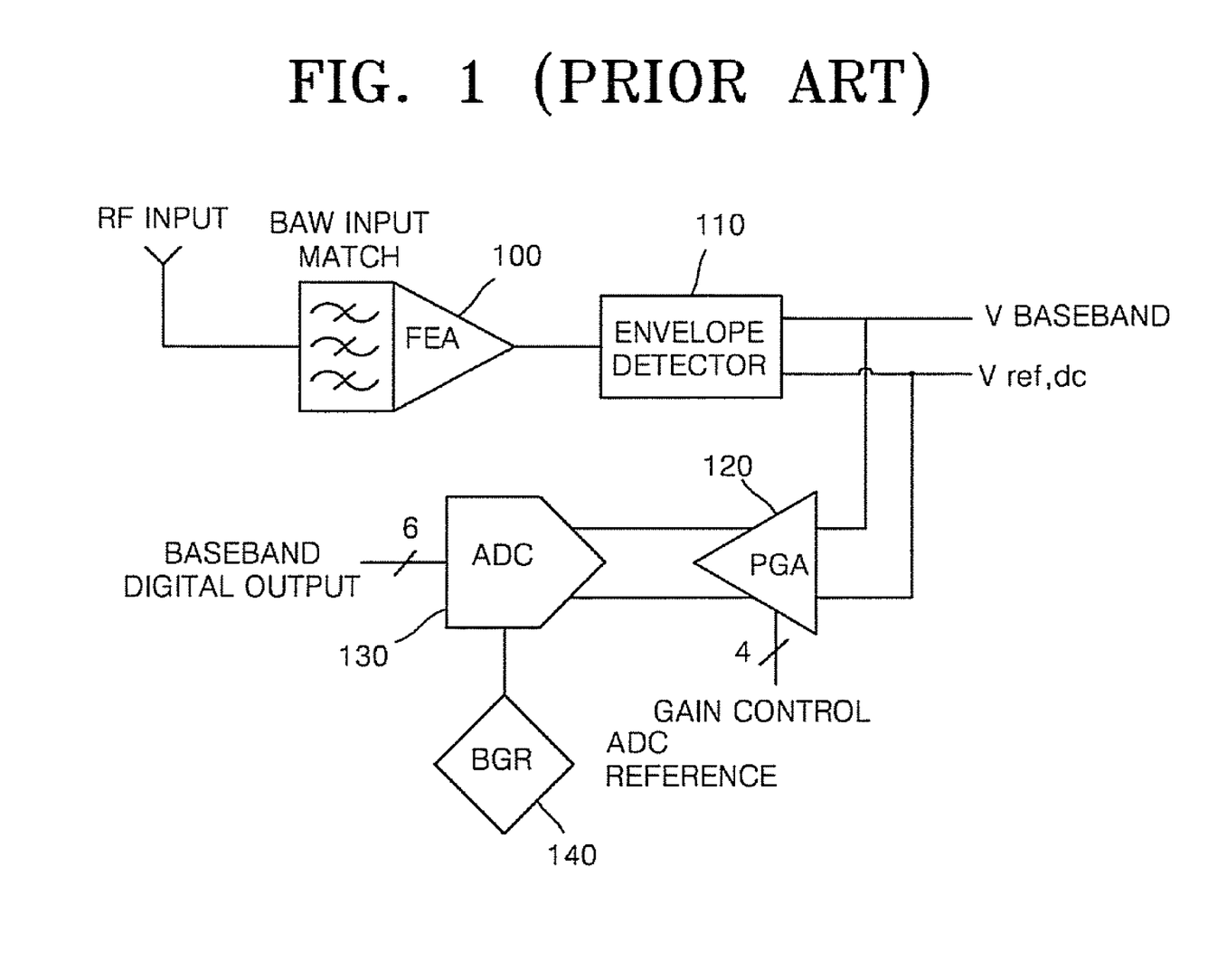
FIGS. 1 and 2 are circuit diagrams of conventional wake-up receivers.
Figure 2:
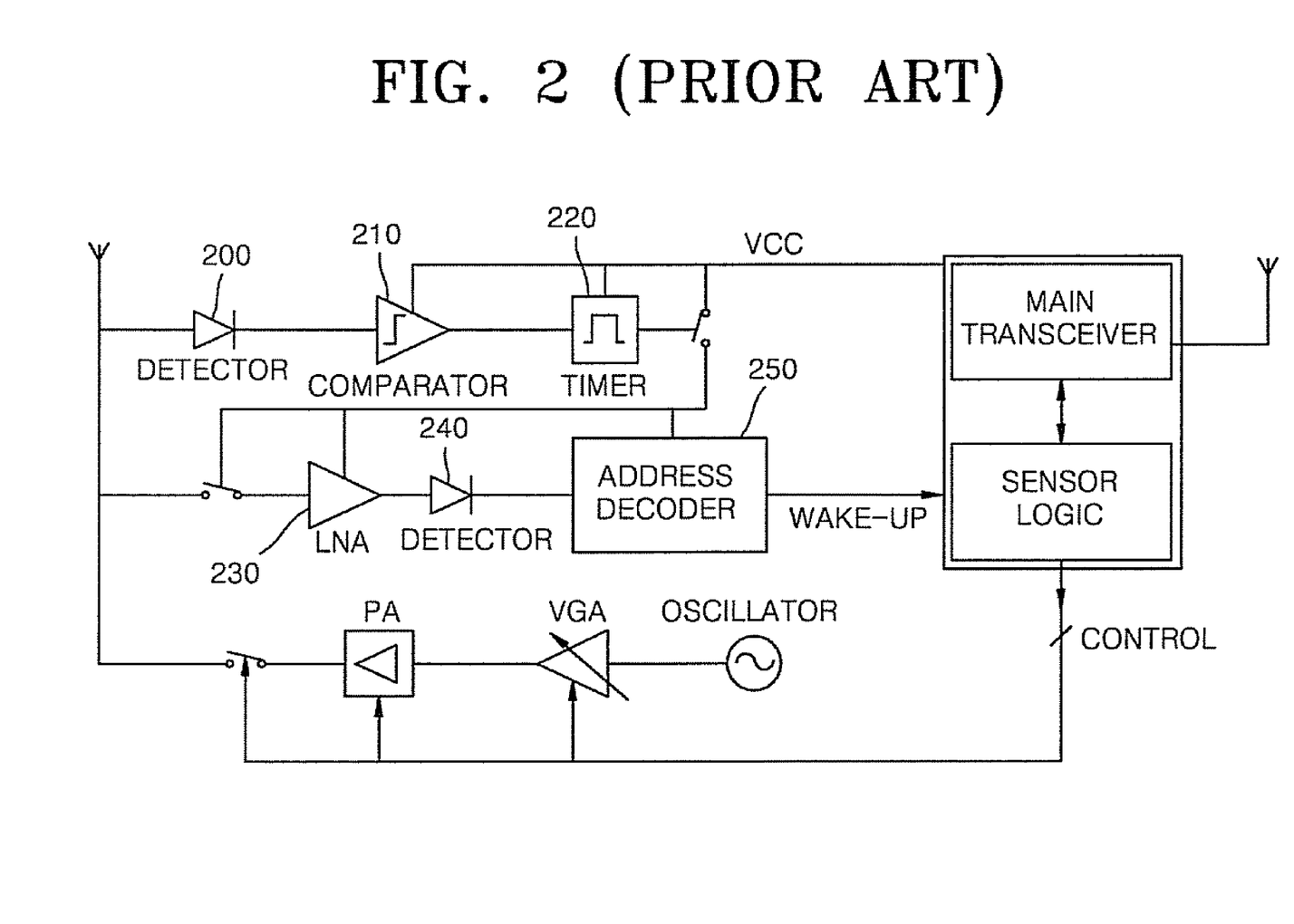

FIGS. 1 and 2 are circuit diagrams of conventional wake-up receivers.

Referring to FIG. 1, the conventional wake-up receiver includes a film bulk acoustic resonator (FBAR) amplifier 100, an envelope detector 110, a programmable gain amplifier (PGA) 120, an analog-to-digital converter (ADC) 130, and a band gap reference (BGR) device (140). The conventional wake-up receiver illustrated in FIG. 1 delivers a radio frequency (RF) signal to the envelope detector 110 by performing high impedance conversion by using the FBAR amplifier 100 and amplification of the RF signal by using a low noise amplifier (LNA) (not shown) in order to obtain a high reception sensitivity. However, the conventional wake-up receiver of FIG. 1 consumes much power due to the use of amplifiers and provides low reception sensitivity at remote sites. Moreover, due to the use of a special element, i.e., the FBAR amplifier 100, the conventional wake-up receiver is difficult to implement as a system-on-a-chip.

Referring to FIG. 2, the conventional wake-up receiver is constructed in 2 stages. A first stage of the two stages includes a detector 200, a comparator 210 and a timer 220, and a residual second stage includes an LNA 230, a detector 240, and an address decoder 250. In an operation of the conventional wake-up receiver of FIG. 2, when sensing a strong burst signal delivered from a transmission side, the conventional wake-up receiver sequentially operates the detector 200, the comparator 210, and the timer 220 in the first stage so as to supply power to the second stage, and switches the second stage to a data signal receiving mode, wherein the signal is received via the LNA 230. Once the first stage switches the second stage to a mode for data reception, the second stage receives data. Although the wake-up receiver illustrated in FIG. 2 consumes a small amount of power because the first stage, which is composed of the detector 200, the comparator 210, and the timer 220, uses no amplifier, it has a low reception sensitivity with respect to the strong burst signal and increases a chip area due to the use of 2 or more detectors. Moreover, the detector 200 in the first stage is a special element including a multi-stage zero-bias Schottky diode, and thus is difficult to integrate by using a complementary metal oxide semiconductor (CMOS) process.

SUMMARY OF THE INVENTION

The present invention provides a wake-up receiver which consumes low power, provides high reception sensitivity at a remote distance and is implemented as a system-on-a-chip based on a complementary metal oxide semiconductor (CMOS) by not using a special component, and a method of implementing the wake-up receiver on a CMOS system-on-a-chip.

According to an aspect of the present invention, there is provided a wake-up receiver waking up a main transceiver, the wake-up receiver including a duty cycle signal generation unit controlling a duty cycle of a duty cycle signal; a burst signal detection unit receiving an input signal comprising a burst signal and a data signal based on the duty cycle signal, amplifying the input signal, and, if the amplified input signal is the burst signal, outputting a control signal; and, a data signal detection unit re-amplifying the amplified input signal based on the control signal, and, if the re-amplified input signal is the data signal, outputting a wake-up signal, wherein power supplied to the duty cycle signal generation unit is interrupted based on the control signal and power is re-supplied to the duty cycle signal generation unit based on the wake-up signal.

The burst signal detection unit and the data signal detection unit may share a demodulation unit detecting an envelope of the input signal so as to restore a digital signal, and the burst signal or the data signal may be determined based on an output of the demodulation unit.

The burst signal detection unit may include a first amplification unit amplifying the input signal, and the data signal detection unit may include a second amplification unit re-amplifying the amplified input signal.

The burst signal of the input signal may be received if the duty cycle signal is activated.

The duty cycle signal may be activated only during a time period within a preset cycle.

The data signal of the input signal may be received if the control signal is activated.

The control signal may be inactivated and power may be re-supplied to the duty cycle signal generation unit, if a preset time period passes after the wake-up signal is output.

According to another aspect of the present invention, there is provided a method of waking up a main transceiver, the method including generating a duty cycle signal and controlling a duty cycle of the duty cycle signal; receiving an input signal comprising a burst signal and a data signal based on the duty cycle signal, amplifying the input signal, and, if the amplified input signal is the burst signal, outputting a control signal; and re-amplifying the amplified input signal based on the control signal, and, if the re-amplified input signal is the data signal, outputting a wake-up signal, wherein the generating of the duty cycle signal is interrupted based on the control signal and is performed based on the wake-up signal.

The outputting of the control signal and the outputting of the wake-up signal may share demodulating the input signal by detecting an envelope of the input signal and restoring a digital signal, and the burst signal or the data signal may be determined based on an output of the demodulating.

The outputting of the control signal may include amplifying the input signal, and the outputting of the wake-up signal may include re-amplifying the amplified input signal.

The burst signal of the input signal may be received if the duty cycle signal is activated.

The duty cycle signal may be activated only during a time period within a preset cycle.

The data signal of the input signal may be received if the control signal is activated.

The control signal may be inactivated and the generating of the duty cycle signal may be re-performed, if a preset time period passes after the wake-up signal is output.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

For a full understanding of the present invention, specific details such as particular circuits, particular elements, and techniques are set forth in the following description. The following description and drawings are not to be construed as limiting the invention and the numerous specific details are described to provide a thorough understanding of the present invention. However in certain instances, well-known or conventional details are not described in order not to unnecessarily obscure the present invention.

Hereinafter, the present invention will be described in detail by explaining preferred embodiments of the invention with reference to the attached drawings. Like reference numerals in the drawings denote like elements.

Herein, exchangeable terms "turn on", "activate", and "enable" mean that power is supplied such that an operation starts, and exchangeable terms "turn off", "deactivate", and "disable" mean that power is interrupted such that an operation stops.

Figure 3:
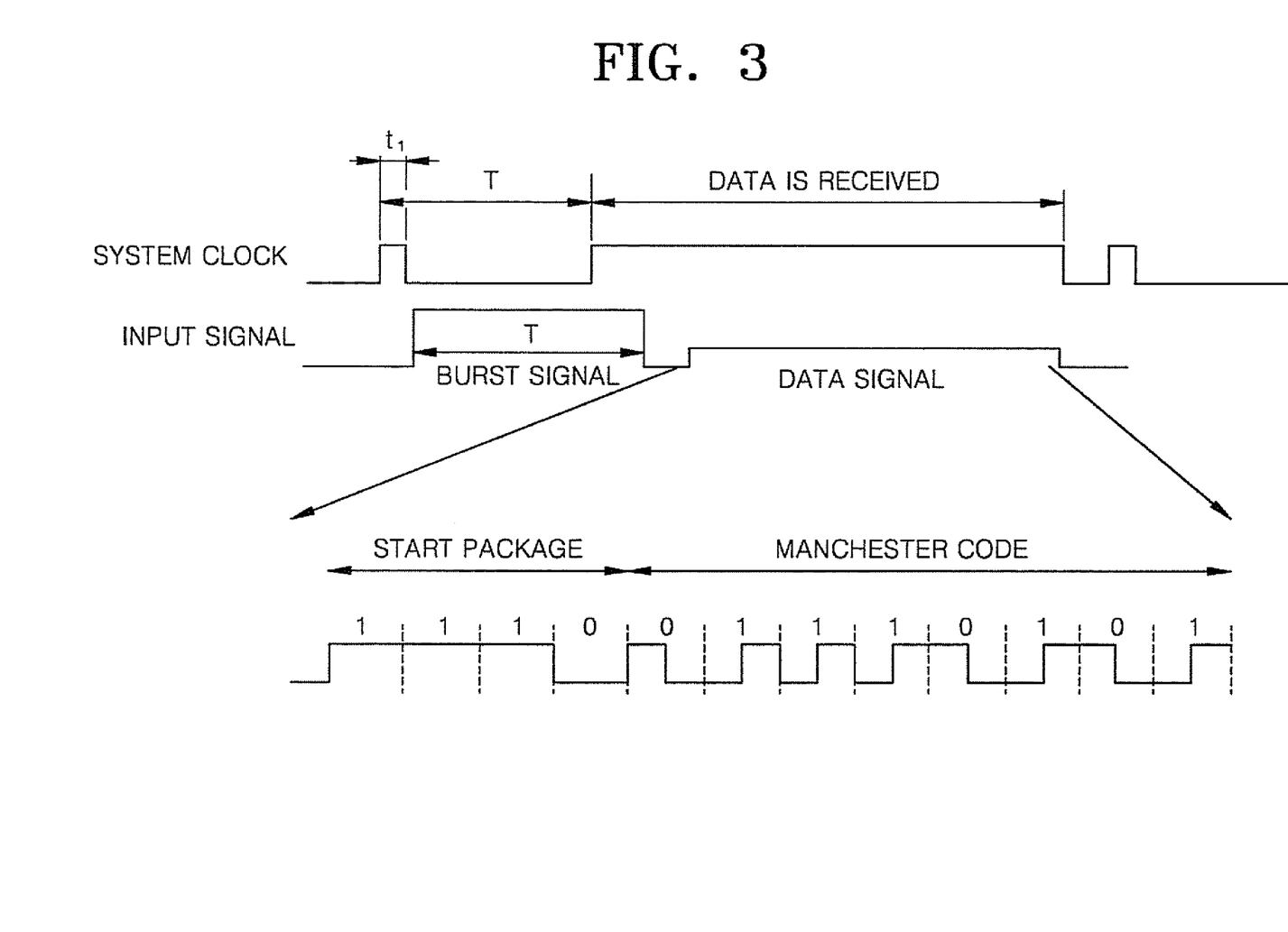
FIG. 3 illustrates timing diagrams of a duty cycle signal and an input signal of a wake-up receiver according to an exemplary embodiment of the present invention.
Figure 4:
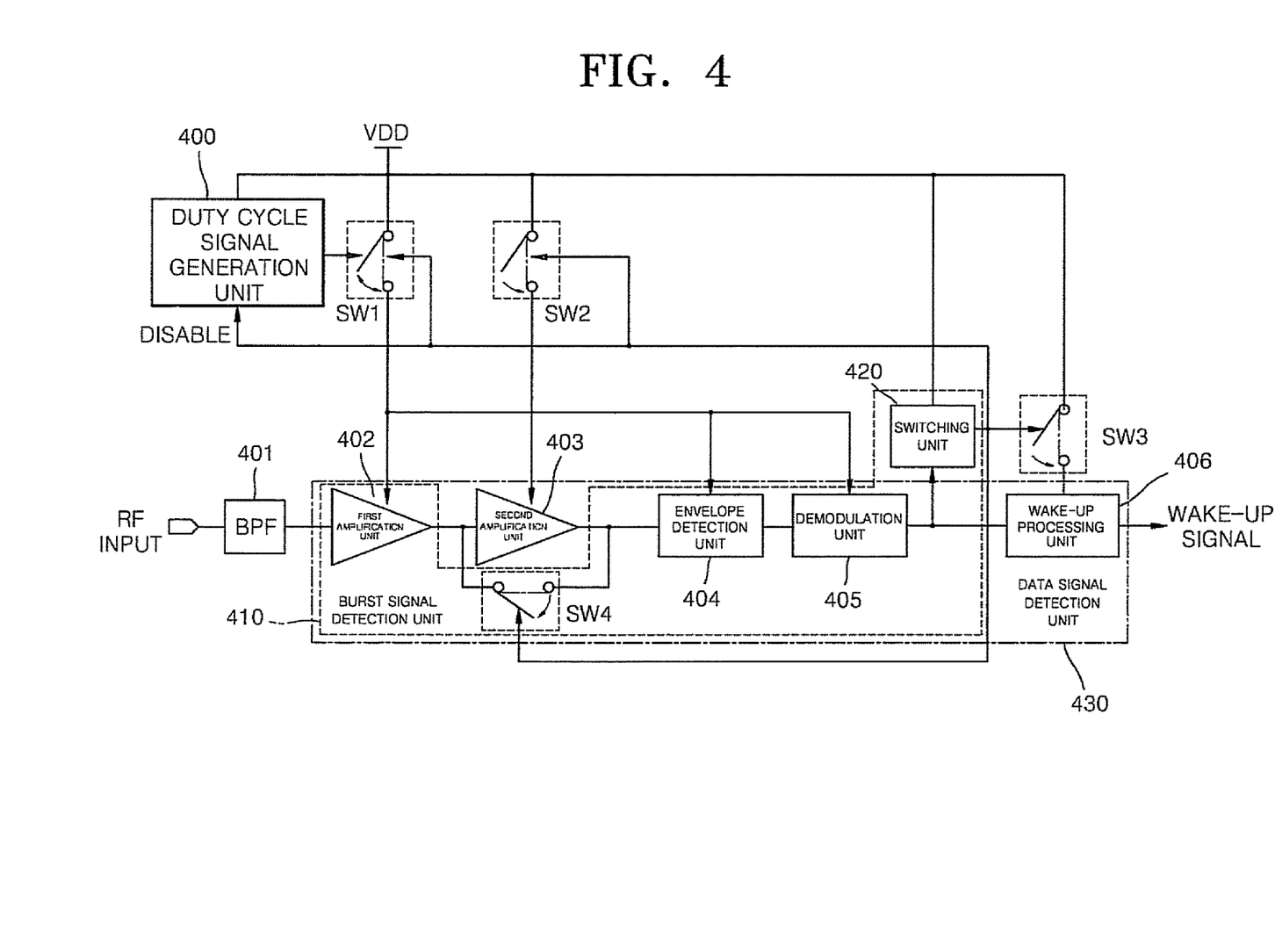
FIG. 4 is a circuit diagram of the wake-up receiver according to the exemplary embodiment of the present invention illustrated in FIG. 3.

FIG. 3 is a timing diagram showing a relationship between a duty cycle signal and an input signal of a wake-up receiver according to an embodiment of the present invention (see FIG. 4). The relationship is based on a result of applying a technique in which the wake-up receiver supplies power to a first amplification unit 402, an envelope detection unit 404, and a demodulation unit 405 (see FIG. 4) only during at least one predetermined time period that exists within a single cycle of a burst signal and interrupts the supply of power to the first amplification unit 402, the envelope detection unit 404, and the demodulation unit 405 during residual time periods of the single cycle of the burst signal. The wake-up receiver detects whether the input signal includes data (i.e. wake-up determination data) for determining whether to wake up a main transceiver. The supply and interruption of power are performed according to a duty cycle signal generated by a duty cycle signal generation unit 400 (see FIG. 4). These components of the wake-up receiver will be described in greater detail with reference to FIG. 4. Although the timing diagram illustrated in FIG. 3 is repeated in cycles, only one cycle is illustrated in FIG. 3 for convenience of explanation. Referring to FIG. 3, T, which is generally 1 ms, but can be changed, indicates a cycle of a burst signal. The duty cycle signal generated by the duty cycle signal generation unit 400 is repeated at the same time intervals as T, but its active period is t1 which is smaller than T and can be changed. Thus, the burst signal can be received only during the active period t1, thereby reducing current consumption by t1/T times.

FIG. 4 is a circuit diagram of a wake-up receiver according to an embodiment of the present invention.

Referring to FIG. 4, the wake-up receiver includes a burst signal detection unit 410 and a data signal detection unit 430. The burst signal detection unit 410 includes a first amplification unit 402, an envelope detection unit 404, a demodulation unit 405, and a switching unit 420. The data signal detection unit 430 shares the first amplification unit 402, the envelope detection unit 404, and the demodulation unit 405 with the burst signal detection unit 410 and includes a second amplification unit 403 and a wake-up processing unit 406. It is assumed that the data signal detection unit 430 is typically turned off until it is turned on by a control signal output from the switching unit 420, and power is supplied to the first amplification unit 402, the envelope detection unit 404, and the demodulation unit 405 only during the active period t1 within the cycle T in response to the duty cycle signal generated by the duty cycle signal generation unit 400 in order to receive the burst signal and power to the first amplification unit 402, the envelope detection unit 404, and the demodulation unit 405 is interrupted during the remaining period of the cycle T.

A radio frequency (RF) signal being received by the wake-up receiver via an antenna (not shown) has already been modulated using on/off keying (OOK) before reception by the wake-up receiver. As mentioned above, the RF signal contains carrier frequencies. Since both a burst signal and a data signal contain carrier frequencies before passing through the envelope detection unit 404, they will be referred to as RF signals as long as they have not yet passed through the envelope detection unit 404. Herein, the burst signal is a typical burst signal which a transmission side transmits with a cycle of about 1 ms and with strong power in order to notify a reception side that data is to be transmitted, before transmitting the data. The burst signal refers to a signal in which transmission of a high power carrier signal starts abruptly while no signals are occurring and lasts for 1 ms or more.

An OOK modulation scheme is typically used in a wireless communication system in order to deliver only information '1' or '0'. In a quick paging channel (QPCH) of a code division multiple access (CDMA) 2000 IX system, as a representative OOK modulation scheme, a 1-bit paging indicator for informing, in units of slots, a terminal of whether paging information is included in a paging slot is OOK-modulated and then transmitted. Such a QPCH is used to reduce power consumption of the terminal by preventing unnecessary paging channel demodulation. In general, although the OOK modulation scheme is not superior to a binary phase shift keying (BPSK) modulation scheme in terms of power efficiency, the OOK modulation scheme is useful in terms of system capacity because a probability of transmitting "ON" is much lower than a probability of transmitting "OFF" and interference due to other users can be reduced. Moreover, the OOK modulation scheme can reduce interference due to other users. For these reasons, the OOK modulation scheme is used to form an optimal embodiment of the present invention.

When the first amplification unit 402, the envelope detection unit 404, and the demodulation unit 405 are turned on by the duty cycle signal generated by the duty cycle signal generation unit 400 only during the active period t1 which is within the cycle T, a strong burst signal received by the wake-up receiver via the antenna is low-noise-amplified by the first amplification unit 402. The burst signal amplified by the first amplification unit 402 is detected as an envelope by the envelope detection unit 404, and the envelope detected by the envelope detection unit 404 is compared with a reference voltage by the demodulation unit 405. If the envelope is greater than the reference voltage, an original digital signal of '1' is restored. If the envelope is less than the reference voltage, an original digital signal of '0' is restored.

Reception of a valid burst signal is sensed by detection of the digital signal restored by the demodulation unit 405 rising from '0' to '1', i.e., by a rising edge of the digital signal. Herein, the valid burst signal means a component other than noise from among components of the RF signal received via the antenna. The sensed burst signal activates the switching unit 420 and thus the switching unit 420 generates a control signal during a predetermined period t2 that is greater than a data reception period of time during which data is received. Herein, the data reception period has substantially the same meaning as a period during which the wake-up processing unit 406 generates a wake-up signal. Generally, the switching unit 420 may include a timer. The control signal output from the switching unit 420 disables the duty cycle signal generation unit 400, and supplies power to the data signal detection unit 430 (until the switching unit 420 is turned off).

Hereinafter, a process in which the control signal output from the switching unit 420 supplies power to the data signal detection unit 430 in order to turn on the data signal detection unit 430 will be described in more detail. The duty cycle signal generation unit 400 is turned off by the control signal output from the switching unit 420. Then, the control signal output from the switching unit 420 instead of the duty cycle signal generated by the duty cycle signal generation unit 400 closes a switch SW1 such that power is supplied to the first amplification unit 402, the envelope detection unit 404, and the demodulation unit 405. At the same time, the control signal output from the switching unit 420 also closes switches SW2 and SW3 connected to the second amplification unit 403 and the wake-up processing unit 406 such that power VDD is supplied to the second amplification unit 403 and the wake-up processing unit 406. A switch SW4 connected from the first amplification unit 402 to the envelope detection unit 404 is opened in order for the second amplification unit 403 to receive data, so that the data signal detection unit 430 including the first amplification unit 402, the second amplification unit 403, the envelope detection unit 404, and the demodulation unit 405 is turned on during the period t2.

In this way, the data signal detection unit 430 is operated by the control signal output from switching unit 420. Thus, a data signal received via the antenna is amplified by the first amplification unit 402 and the second amplification unit 403 and the amplified data signal is detected as the envelope by the envelope detection unit 404. The detected envelope is compared with the reference voltage by the demodulation unit 405, and as a result of the comparison the original digital signal is restored as '1' if the detected envelope is greater than the reference voltage and the original digital signal is restored as '0' if the detected envelope is less than the reference voltage.

The wake-up processing unit 406 determines whether the received restored digital data signal is noise by determining whether the restored digital signal matches a predetermined unique wake-up identification (ID), thereby outputting a wake-up signal.

When the wake-up signal is output, the period t2 of the switching unit 420, which is greater than the period during which the wake-up signal is generated, expires and thus the switching unit 420 is turned off. When the switching unit 420 is turned off, the data signal detection unit 430, which has been turned on by the control signal output from the switching unit 420, is turned off. At the same time, the duty cycle signal generation unit 400 is enabled in order to control the switch SW1, which has been controlled by the control signal output from the switching unit 420. Thus, power is supplied to the first amplification unit 402, the envelope detection unit 404, and the demodulation unit 405 which are activated during the period t1 within the cycle T by using the duty cycle signal generated by the duty cycle signal generation unit 400, and thus the first amplification unit 402, the envelope detection unit 404, and the demodulation unit 405 can receive the burst signal again.

Figure 5:
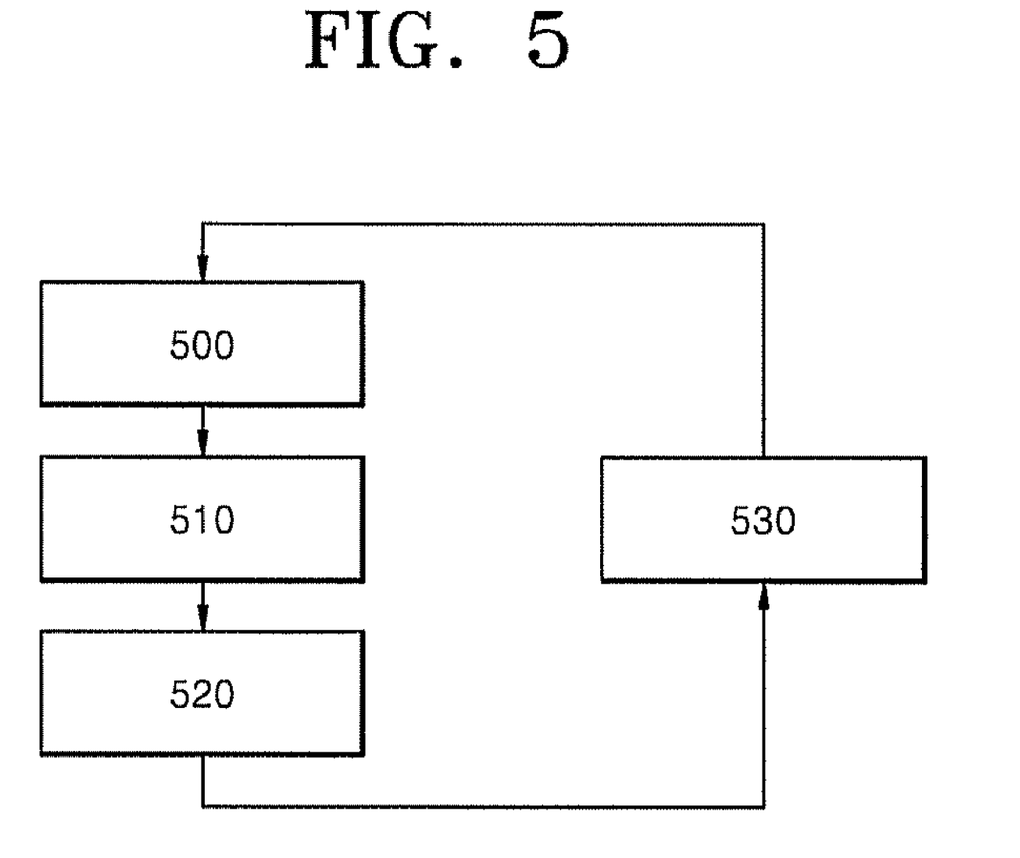
FIG. 5 is a flowchart illustrating a method of waking up a main transceiver according to an exemplary embodiment of the present invention.

FIG. 5 is a flowchart illustrating a wake-up method as described above with reference to FIG. 4.

Referring to FIG. 5, in operation 500, a wake-up receiver receives a burst signal via an antenna only during the active period t1 that is included in the cycle T as illustrated in FIG. 3.

In operation 510, the received burst signal is amplified, and an envelope is detected from the amplified burst signal and is compared with a reference voltage. As a result of the comparison, an original digital signal is reconstructed as '1' if the detected envelope is greater than the reference voltage, and is reconstructed as '0' if the detected envelope is less than the reference voltage. In operation 510, reception of a valid burst signal is sensed by detection of the reconstructed original signal rising from '0' to '1'.

In operation 520, once the burst signal is sensed, wake-up data is received via the antenna and is amplified, and an envelope is detected from the amplified data and compared with a reference voltage. As a result of the comparison an original digital signal is reconstructed as '1' if the detected envelope is greater than the reference voltage, and is reconstructed as '0' if the detected envelope is less than the reference voltage. In operation 520, it is determined whether the reconstructed original digital signal matches a predetermined unique wake-up ID, thereby generating a wake-up signal.

In operation 530, after the period t2 expires, the method returns to operation 500.

Figure 6A:
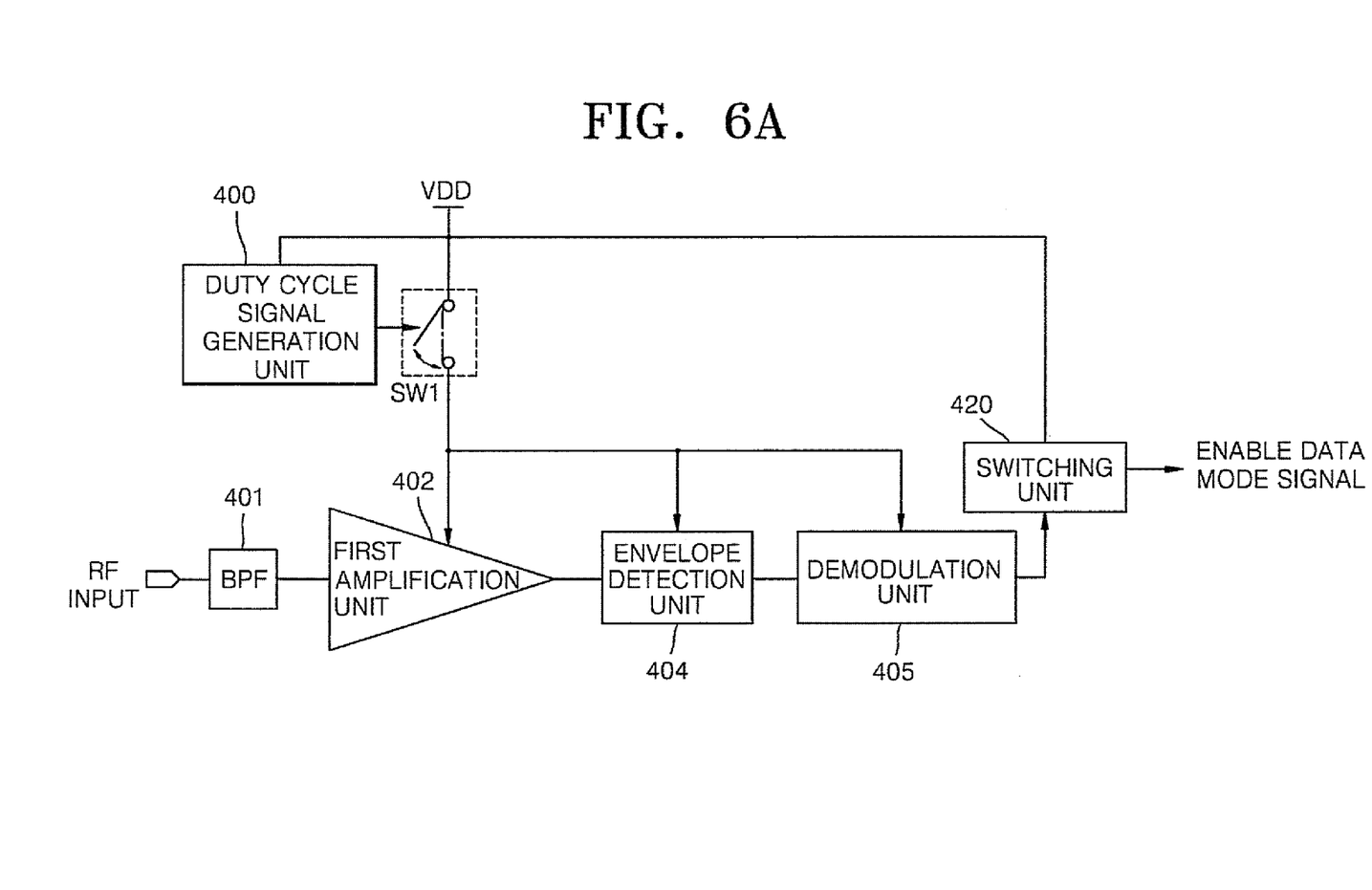
FIG. 6A is a circuit diagram of the wake-up receiver illustrated in FIG. 4 when the wake-up receiver operates in a burst signal detection mode.
Figure 6B:
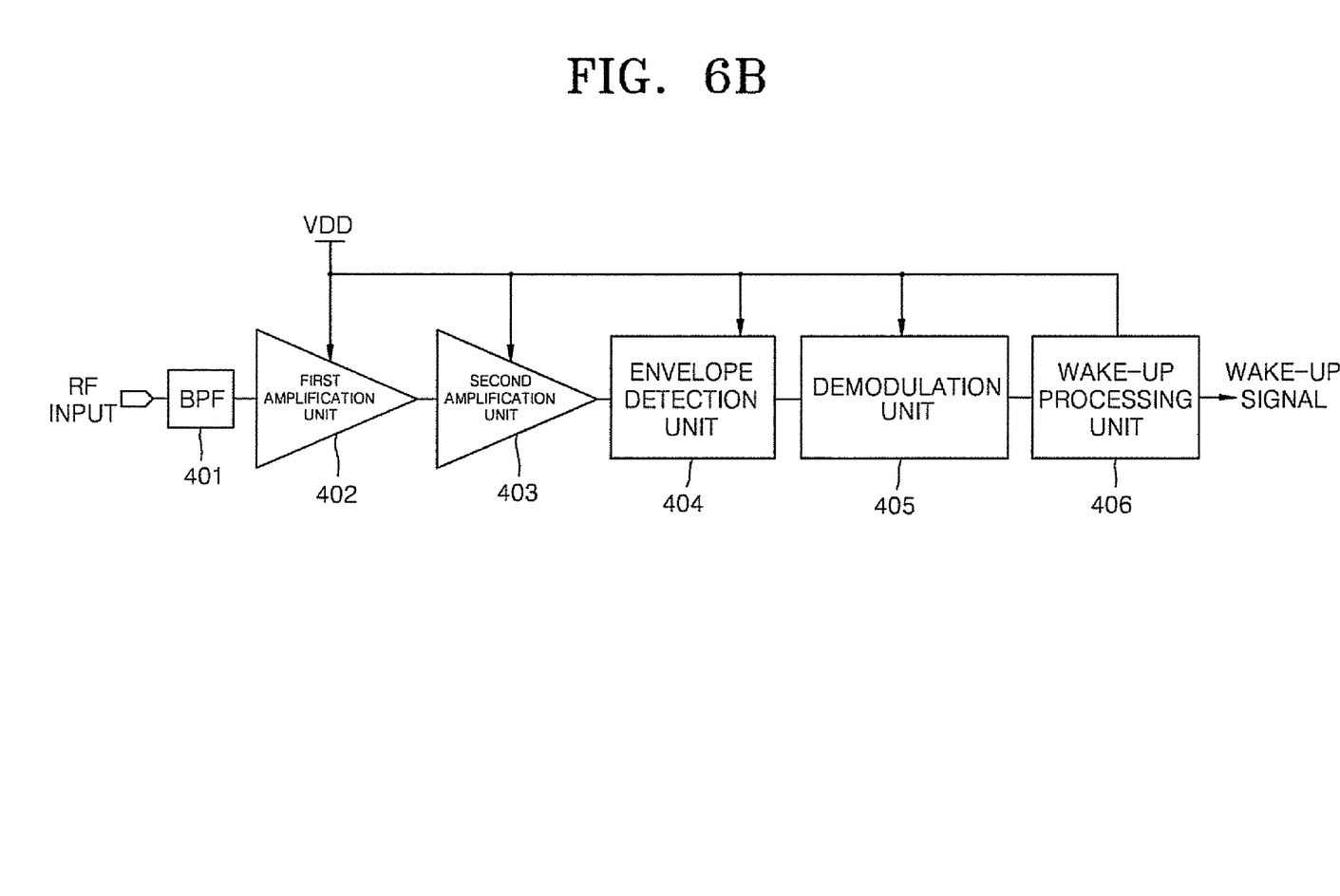
FIG. 6B is a circuit diagram of the wake-up receiver illustrated in FIG. 4, when the wake-up receiver operates in a data signal detection mode.

FIG. 6A is a circuit diagram of the wake-up receiver illustrated in FIG. 4, which operates in a burst signal detection mode, and FIG. 6B is a circuit diagram of the wake-up receiver illustrated in FIG. 4, which operates in a data signal detection mode. In FIGS. 6A and 6B, like reference numerals indicate like elements.

An operation of the wake-up receiver of FIG. 4 in the burst signal detection mode will now be described with reference to FIG. 6A. Referring FIG. 6A, when the first amplification unit 402, the envelope detection unit 404, and the demodulation unit 405 are turned on by the duty cycle signal generated by the duty cycle signal generation unit 400 only during the period t1 within the cycle T, the strong burst signal received via the antenna (not shown) and input to the wake-up receiver is low-noise-amplified by the first amplification unit 402. The burst signal amplified by the first amplification unit 402 is detected as an envelope by the envelope detection unit 404 and the envelope detected by the envelope detection unit 404 is compared with the reference voltage by the demodulation unit 405. If the envelope is greater than the reference voltage, an original digital signal is reconstructed as '1'. If the envelope is less than the reference voltage, the original digital signal is reconstructed as '0'. Reception of a valid burst signal is sensed by detection of the digital signal reconstructed by the demodulation unit 405 rising from '0' to '1', i.e., by a rising edge of the digital signal. The sensed burst signal activates the switching unit 420 and thus the switching unit 420 generates a control signal during the period t2. In other words, the switching unit 420 enables a data signal detection mode signal.

An operation of the wake-up receiver of FIG. 4 in the data signal detection mode will now be described with reference to FIG. 6B. Referring to FIG. 6B, the data signal detection unit 430 is operated by the control signal output from the switching unit 420 as described above. Thus, a data signal received via the antenna is amplified by the first amplification unit 402 and the second amplification unit 403 and the amplified data signal is detected as an envelope. The envelope detected by the envelope detection unit 404 is compared with the reference voltage by the demodulation unit 405. If the envelope is greater than the reference voltage, an original digital signal is reconstructed as '1'. If the envelope is less than the reference voltage, the original digital signal is reconstructed as '0'. The wake-up processing unit 406 determines whether the reconstructed digital signal matches the predetermined unique wake-up ID, thereby outputting a wake-up signal.

As described above, a wake-up receiver according to the present invention can be implemented as a CMOS-based system-on-a-chip since a special element such as an FBAR amplifier or a zero bias Schottky diode is not used.

In addition, the wake-up receiver according to the present invention usually operates in a burst signal detection mode from among the burst signal detection mode and a data signal detection mode by means of a duty cycle signal generated by a duty cycle signal generation unit, and changes its mode to a data signal detection mode by means of a control signal output from switching unit when a burst signal having power equal to or greater than a predetermined level is sensed. In the data signal detection mode, the wake-up receiver detects a valid wake-up signal by means of a wake-up processing unit. The wake-up receiver has a structure in which an operating mode is changed according to stages in such a way that the wake-up receiver may switch its operation mode from the data signal detection mode to the burst signal detection mode after the wake-up signal is detected by the wake-up processing unit or switch its operation mode from the data signal detection mode to the burst signal detection mode by using an internal timer of the switching unit, thereby remarkably reducing average power consumption.

Furthermore, the burst signal detection mode is executed only during a predetermined period which is included in a predetermined cycle of a duty cycle signal depending on a duty cycle signal generated by a duty cycle signal generation unit, and power supply is interrupted during the remaining period of the predetermined cycle, thereby reducing the time for the reception of the burst signal. This results in implementation of a low-power wake-up receiver.

Moreover, the burst signal detection unit and the data signal detection unit share an amplification unit, an envelope detection unit, and a demodulation unit, thereby reducing a circuit area for implementing the wake-up receiver. Moreover, the wake-up receiver can have high reception sensitivity at remote distances by using an amplifier in the burst signal detection mode.

The present invention can be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over network of coupled computer systems so that the computer-readable code is stored and executed in a decentralized fashion. Also, functional programs, code, and code segments for implementing the present invention can be easily construed by programmers of ordinary skill in the art.

While the present invention has been particularly shown and described with reference to an embodiment thereof, it will be understood by those of ordinary skill in the art that various changes in form and detail may be made therein without departing from the spirit and scope of the present invention as defined by the following claims.

What is claimed is:

1. A wake-up receiver for waking up a main transceiver, the wake-up receiver comprising:
   a duty cycle signal generation unit controlling a duty cycle of a duty cycle signal;
   a burst signal detection unit receiving an input signal comprising a burst signal and a data signal based on the duty cycle signal, amplifying the input signal, and, if the amplified input signal is the burst signal, outputting a control signal; and
   a data signal detection unit re-amplifying the amplified input signal based on the control signal, and, if the re-amplified input signal is the data signal, outputting a wake-up signal,
   wherein power supplied to the duty cycle signal generation unit is interrupted based on the control signal and power is re-supplied to the duty cycle signal generation unit based on the wake-up signal.

2. The wake-up receiver of claim 1, wherein the burst signal detection unit and the data signal detection unit share a demodulation unit detecting an envelope of the input signal so as to restore a digital signal, and
   wherein the burst signal or the data signal is determined based on an output of the demodulation unit.

3. The wake-up receiver of claim 1, wherein the burst signal detection unit comprises a first amplification unit amplifying the input signal, and
   wherein the data signal detection unit comprises a second amplification unit re-amplifying the amplified input signal.

4. The wake-up receiver of claim 1, wherein the burst signal of the input signal is received if the duty cycle signal is activated.

5. The wake-up receiver of claim 4, wherein the duty cycle signal is activated only during a time period within a preset cycle.

6. The wake-up receiver of claim 1, wherein the data signal of the input signal is received if the control signal is activated.

7. The wake-up receiver of claim 1, wherein the control signal is inactivated and power is re-supplied to the duty cycle signal generation unit, if a preset time period passes after the wake-up signal is output.

8. A method of waking up a main transceiver, the method comprising:
 generating a duty cycle signal and controlling a duty cycle of the duty cycle signal;
 receiving an input signal comprising a burst signal and a data signal based on the duty cycle signal, amplifying the input signal, and, if the amplified input signal is the burst signal, outputting a control signal; and
 re-amplifying the amplified input signal based on the control signal, and, if the re-amplified input signal is the data signal, outputting a wake-up signal,
 wherein the generating of the duty cycle signal is interrupted based on the control signal and is performed based on the wake-up signal.

9. The method of claim 8, wherein the outputting of the control signal and the outputting of the wake-up signal share demodulating the input signal by detecting an envelope of the input signal and restoring a digital signal, and
 wherein the burst signal or the data signal is determined based on an output of the demodulating.

10. The method of claim 8, wherein the outputting of the control signal comprises amplifying the input signal, and
 wherein the outputting of the wake-up signal comprises re-amplifying the amplified input signal.

11. The method of claim 8, wherein the burst signal of the input signal is received if the duty cycle signal is activated.

12. The method of claim 11, wherein the duty cycle signal is activated only during a time period within a preset cycle.

13. The method of claim 8, wherein the data signal of the input signal is received if the control signal is activated.

14. The method of claim 8, wherein the control signal is inactivated and the generating of the duty cycle signal is re-performed, if a preset time period passes after the wake-up signal is output.

* * * * *